(No Model.)
A. DUCASBLE.
TIRE.
No. 506,424. Patented Oct. 10, 1893.
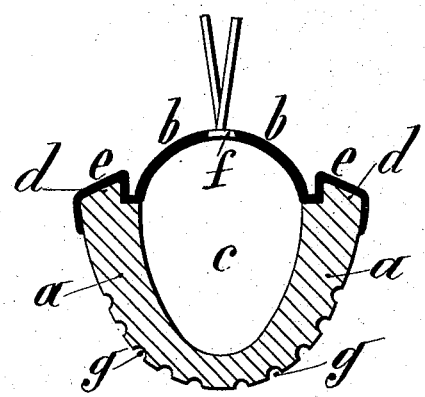
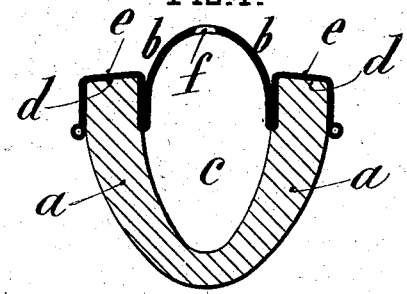
Witnesses:
L. M. Wachschlager
Charles E. Smith
Inventor
Alfred Ducasble,
By Briesen & Knauth
his Attorneys.

UNITED STATES PATENT OFFICE.

ALFRED DUCASBLE, OF PARIS, FRANCE.

TIRE.

SPECIFICATION forming part of Letters Patent No. 506,424, dated October 10, 1893.

Application filed April 12, 1893. Serial No. 470,022. (No model.) Patented in France March 28, 1892, No. 220,457, and in Belgium September 14, 1892, No. 101,368.

*To all whom it may concern:*

Be it known that I, ALFRED DUCASBLE, of the city of Paris, Republic of France, have invented Improvements in Tires, (for which I have obtained Letters Patent in France for fifteen years, dated March 28, 1892, No. 220,457, and in Belgium for fifteen years, dated September 14, 1892, No. 101,368,) of which the following is a full, clear, and exact description.

This invention relates to elastic tires for wheels, and it consists of a hollow tire of semi-elliptic form in section made of a strip of india-rubber lined with fabric, the rubber being thinner at the vertex of the semi-ellipse which bears upon the ground and the thickened edges of the strip being received in grooves in the wheel rim which is of the special form hereinafter described.

Reference is to be had to the accompanying drawings, forming part of this specification, in which—

Figures 1 and 2 represent cross-sections of two forms of the improved tire.

$a$ is the hollow rubber tire of semi-elliptical form whose edges $d$ are received in grooves $e$ formed at each side of the wheel rim wherein they are retained by the tension of the tire and secured or not by cement. The vertex of the semi-ellipse forms the tread of the tire which is made thinner at this part than at the sides the curvatures of the inner and outer surfaces not being concentric. The hollow $c$ inclosed by the tire forms an air space and in order to increase the elasticity or flexibility of the tire a hole $f$ is made in the wheel rim for the inlet and outlet of air and this hole may be provided with a small funnel mouth. The depression of the tire which occurs on meeting an obstacle displaces some of the contained air which escapes through the orifice $f$, but the tire in resuming its shape after passing over the obstacle automatically draws in air to replace that which has been discharged and so on, whereby all shock is avoided.

The puncturing of such a tire would entail no repairs, as the effect would merely be to render it more flexible without affecting its automatic action.

The tire when made of india-rubber may be molded with longitudinal grooves $g$, as shown in Fig. 2, to prevent side slipping.

I claim—

The combination of a tire, semi-elliptical in cross-section, said tire being thickest at the base where it joins the rim and gradually decreasing in thickness to the vertex which forms the tread, a wheel rim having projections on each side adapted to embrace the tire on the inner and outer sides of the thickest portion or base thereof, and an open air vent $f$ in said rim in communication with the interior of the tire, substantially as and for the purposes specified.

The foregoing specification of my improvements in tires signed by me this 24th day of March, 1893.

ALFRED DUCASBLE.

Witnesses:
HENRI CAUDAS,
ERNEST CISSIER.